(12) United States Patent
Gebert et al.

(10) Patent No.: US 9,783,044 B2
(45) Date of Patent: Oct. 10, 2017

(54) FUEL CONTAINER

(71) Applicant: Kautex Textron GmbH & Co. KG, Bonn (DE)

(72) Inventors: Klaus Gebert, Willich (DE); Frank Quant, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/771,052

(22) PCT Filed: Feb. 20, 2014

(86) PCT No.: PCT/EP2014/053332
§ 371 (c)(1),
(2) Date: Aug. 27, 2015

(87) PCT Pub. No.: WO2014/131686
PCT Pub. Date: Sep. 4, 2014

(65) Prior Publication Data
US 2016/0001651 A1 Jan. 7, 2016

(30) Foreign Application Priority Data
Feb. 27, 2013 (DE) .................. 10 2013 003 246

(51) Int. Cl.
*B65D 1/42* (2006.01)
*B65D 6/34* (2006.01)
(Continued)

(52) U.S. Cl.
CPC .......................... *B60K 15/03177* (2013.01);
*B60K 2015/0344* (2013.01);
*B60K 2015/0346* (2013.01);
(Continued)

(58) Field of Classification Search
CPC .......... B60K 15/077; B60K 2015/0775; B60K 2015/0777; B60K 2015/0344; B60K 15/03177
See application file for complete search history.

(56) References Cited

U.S. PATENT DOCUMENTS

| | | | | |
|---|---|---|---|---|
| 684,701 A | * | 10/1901 | Meinecke | A45C 13/004 383/127 |
| 3,319,684 A | * | 5/1967 | Calhoun | A61J 1/05 190/107 |

(Continued)

FOREIGN PATENT DOCUMENTS

| | | |
|---|---|---|
| BE | 1009618 A3 | 5/1997 |
| EP | 2163694 A2 | 3/2010 |

(Continued)

OTHER PUBLICATIONS

PCT International Search Report mailed Sep. 12, 2014, received in corresponding PCT Application No. PCT/EP14/53332, 4 pgs.

(Continued)

*Primary Examiner* — Fenn C Mathew
*Assistant Examiner* — Andrew T Kirsch
(74) *Attorney, Agent, or Firm* — Grossman Tucker Perreault & Pfleger, PLLC

(57) ABSTRACT

The invention relates to a fuel container (1) of thermoplastic plastics material having an upper base (2) and a lower base (3) which are supported against each other by means of at least one column-like support element (4), wherein the support element (4) is connected in a positive-locking manner and/or materially engaging manner to a wall (6) of the upper base on the one hand and to a wall (6) of the lower base on the other hand in such a manner that it can absorb tensile forces and/or pressure forces, wherein the support element (4) is constructed in several pieces and the support element is divided longitudinally and comprises at least two (Continued)

Figure 1:
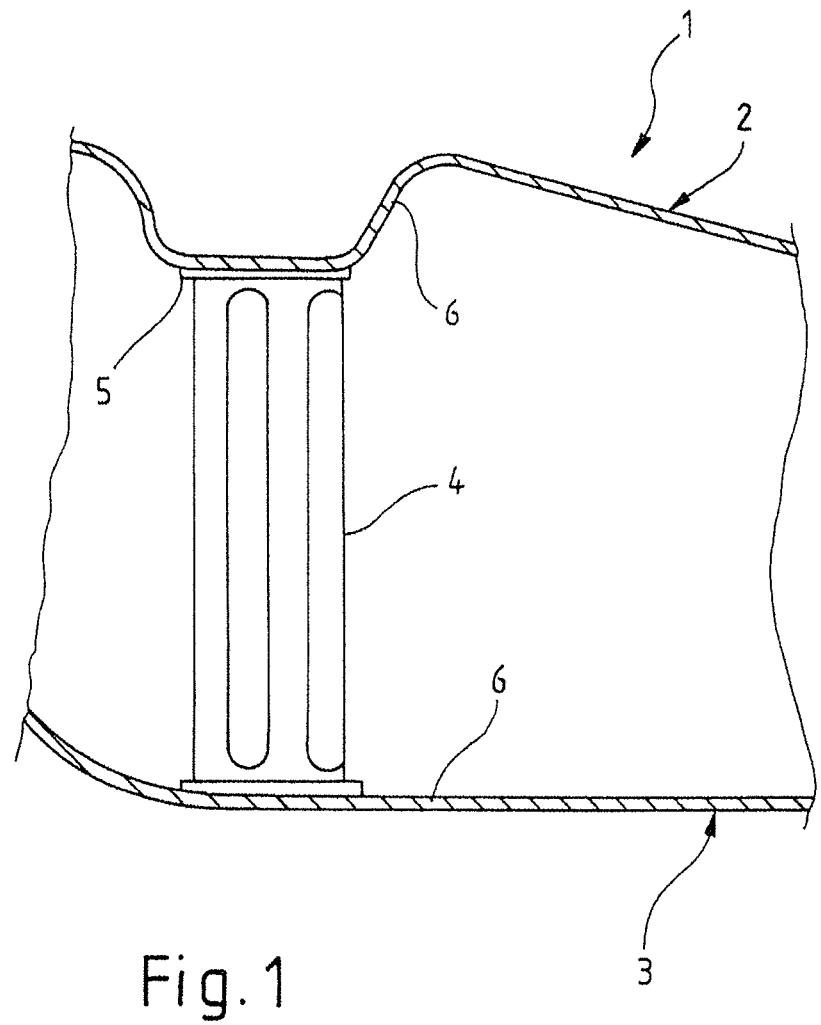

segments (8) which complement each other in cross-section and which form a common support face at the end side.

14 Claims, 3 Drawing Sheets

(51) Int. Cl.
 *B65D 8/08* (2006.01)
 *B60K 15/077* (2006.01)
 *B60K 15/03* (2006.01)
 *B65D 6/00* (2006.01)
 *B65D 8/00* (2006.01)
 *B65D 6/28* (2006.01)

(52) U.S. Cl.
 CPC .......... *B60K 2015/03467* (2013.01); *B60K 2015/03493* (2013.01); *B60K 2015/0775* (2013.01); *B60Y 2306/01* (2013.01)

(56) References Cited

U.S. PATENT DOCUMENTS

| | | | |
|---|---|---|---|
| 6,138,859 | A | 10/2000 | Aulph et al. |
| 6,606,980 | B1 | 8/2003 | Walter |
| 7,455,190 | B2 | 11/2008 | Potter et al. |
| 8,490,807 | B2 | 7/2013 | Varga |
| 9,168,830 | B2 | 10/2015 | Park |
| 2002/0100759 | A1 | 8/2002 | Schmidt et al. |
| 2009/0250458 | A1 | 10/2009 | Criel et al. |
| 2011/0139793 | A1* | 6/2011 | Park ................ B60K 15/03177 220/563 |
| 2012/0138606 | A1* | 6/2012 | Varga ............... B60K 15/03177 220/4.21 |
| 2012/0227237 | A1 | 9/2012 | Tabuchi |
| 2012/0325822 | A1 | 12/2012 | Pozgainer |
| 2013/0160274 | A1 | 6/2013 | De Man et al. |
| 2013/0213973 | A1 | 8/2013 | Esser |

FOREIGN PATENT DOCUMENTS

| | | |
|---|---|---|
| ES | 2226532 A1 | 3/2005 |
| FR | 2226532 A1 | 11/1974 |
| GB | 2236288 A | 4/1991 |

OTHER PUBLICATIONS

PCT International Written Opinion mailed Sep. 12, 2014, received in corresponding PCT Application No. PCT/EP14/53332, 8 pgs.

Third Party Observation for Application No. EP20160165592, Feb. 22, 2017, 2 pgs. (in English language).

Nonpatent Literature 1, non-published patent application, "Stiffening Element for a Liquid Container for a Motor Vehicle and Liquid Container for a Motor Vehicle with a Stiffening Element", referenced in the Third Party Observation for Application No. EP20160165592, Feb. 22, 2017, with English language translation of the Abstract, 36 pgs.

Nonpatent Literature 2, non-published patent application, "Process for Producing a Liquid Container, Liquid Container for a Motor Vehicle and Structure for Reduction of Sloshing Noises", referenced in the Third Party Observation for Application No. EP20160165592, Feb. 22, 2017, with English language translation of the Abstract, 36 pgs.

* cited by examiner

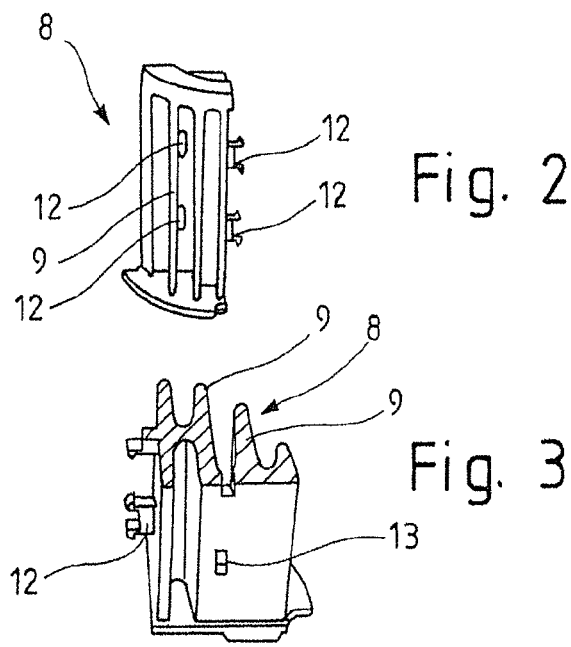
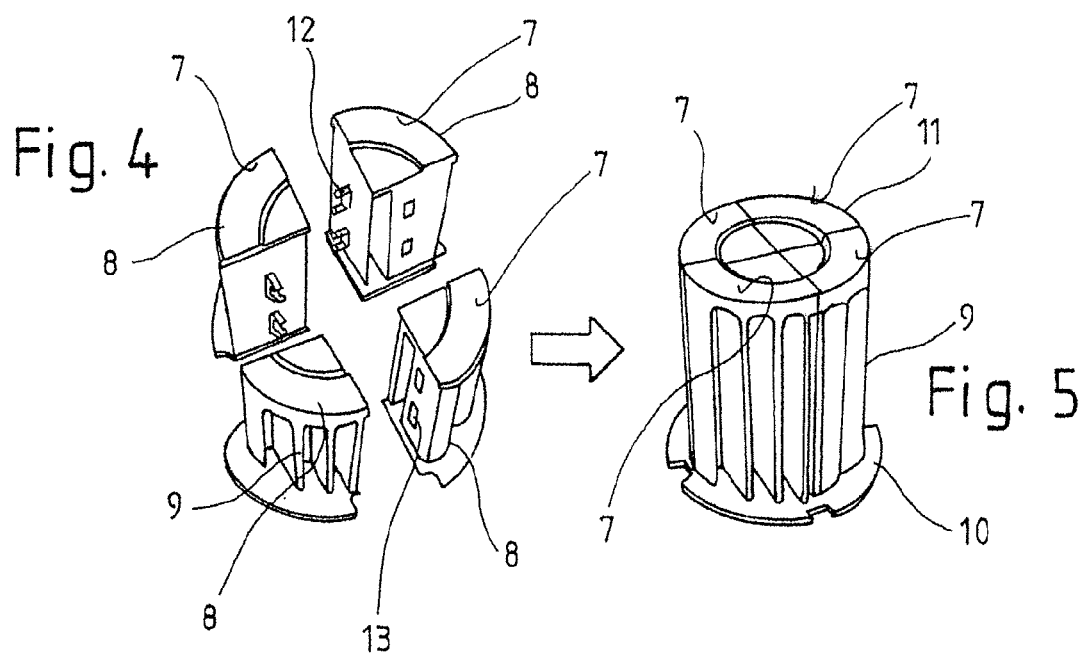

FUEL CONTAINER

The invention relates to a fuel container of thermoplastic plastics material having an upper base and a lower base which are supported against each other by means of at least one column-like support element, wherein the support element is connected in a positive-locking manner and/or materially engaging manner to a wall of the upper base on the one hand and to a wall of the lower base on the other hand in such a manner that it can absorb tensile forces which are brought about by the pressure inside the container, wherein the support element is constructed in several pieces.

A fuel container of the type mentioned in the introduction is known, for example, from DE 10 2009 036 911 A1. This relates to a propellant container which comprises two shells, is operated under excess pressure and is reinforced by means of an inner column in such a manner that, when the two shells are joined together, a connection having tensile strength is produced. To this end, the column comprises a first and a second portion which is connected to the respective shell, wherein one portion is provided with catches and the other portion is provided with catch hooks which, when joined together, produce a snap-fitting connection having tensile strength.

The column has a relatively large cross-section and in each case a relatively large welding flange for welding to the shells of the propellant container. A rib structure extends therebetween, wherein this structure is non-torsionally rigid in order to enable the engagement of the two portions of the column when the shells are joined together.

As a result of the introduction of such tension rods inside the fuel container, the rigidity of the container assembly is increased considerably. However, when deformation forces resulting from impacts are introduced into the fuel container, this rigidity of the system may also have disadvantages. The upper base and the lower base of the fuel container are subjected to relatively high levels of shearing stress in the event of an impact, which may lead to the so-called tension rods or columns being torn out in the region of the welding thereof to the upper base or the lower base of the fuel container.

It is therefore known in principle to provide column-like tension rods with desired breaking locations, which fail when specific deformation forces are exceeded, whereby it is ensured that the fuel container does not become non-fluid-tight in the event of an impact.

Depending on the size of the fuel container and its contour or depending on the number of part-volumes formed in the fuel container, however, it is often necessary to arrange a plurality of support elements which are constructed as tension rods inside the fuel container, whereby the shearing resistance of the container is again considerably increased so that, in the event of loading, it cannot be readily ensured that the support elements fail at the predetermined locations.

An object of the invention is therefore to provide a fuel container of the type mentioned in the introduction which has a degree of volume consistency and resistance against changes of shape in the event of increased or decreased internal pressure and which nonetheless permits relatively non-destructive shearing between the upper base and lower base of the fuel container.

The object is achieved with the features of claims 1 and 14. Advantageous embodiments of the fuel container according to the invention will be appreciated from the dependent claims.

The invention comprises a fuel container of thermoplastic plastics material having an upper base and a lower base which are supported against each other by means of at least one column-like support element, wherein the support element is connected in a positive-locking manner and/or materially engaging manner to a wall of the upper base on the one hand and to a wall of the lower base on the other hand in such a manner that it can absorb tensile forces which are brought about by the pressure inside the container, wherein the support element is constructed in several pieces. The support element according to the invention is divided longitudinally and comprises at least two segments which preferably complement each other in cross-section and which form a common support face at the end side.

In particular as a result of the fact that the support element is divided longitudinally, the support element has on the whole a smaller bending moment of inertia. Furthermore, a uniform distribution of the bending moment of inertia is achieved on the periphery of the support element.

It is particularly advantageous for the segments of the support element to be arranged so as to be able to be moved relative to each other at least in a longitudinal direction so that they allow a shearing movement between the upper base and lower base of the fuel container within specific limits so that it is advantageously ensured that they are not torn from the container wall, for example, in regions of the welding connections thereof to the upper shell and the lower shell.

On the whole, such an arrangement ensures that, when shearing forces are introduced into the fuel container, shearing tensions are built up to a lesser extent.

Advantageously, the segments are each constructed integrally.

The segments may each have desired breaking locations or desired breaking lines which extend transversely or diagonally with respect to the longitudinal extent thereof and which enable defined failure in the event of an overload.

Of course, the segments may also be constructed in several pieces, that is to say, may be divided, for example, transversely relative to the longitudinal extent thereof.

It is advantageous for the segments to have a rib profile in cross-section, whereby it is particularly ensured that the available free space within the fuel container is not subjected to excessive stress. At the same time, increased stability is thereby achieved with relatively low mass of the support element.

It is particularly advantageous for each segment to be constructed in each case in cross-section as a solid profile having a rib structure. Such a solid profile can be produced in a relatively simple manner by means of injection-molding, extrusion or sintering.

The segments may comprise a thermoplastic plastics material and optionally partially comprise a duroplastic plastics material In a particularly advantageous variant of the fuel container of the invention, there is provision for at least one segment to have at least one baffle plate element which is formed in an integral manner. The baffle plate element may, for example, be constructed as a continuation of a rib of the segment.

In an additionally extremely advantageous variant of the fuel container according to the invention, there may be provision for at least two segments to receive at least one baffle plate element or retention element for lines, connectors or the like between them. This baffle plate element can then extend at least in a separation plane which is formed between the segments.

At least one segment may have at least one securing means for built-in components or a line of the fuel container. Groove profiles, retention brackets or, for example, C-shaped retention clips may, for example, be arranged as securing means on at least one segment.

Alternatively or additionally, at least one baffle plate element may have at least one securing element for a built-in component or a line of the fuel container. The baffle plate element may, for example, receive one or more substantially C-shaped grooves for clamping lines which are laid in the fuel container.

In an advantageous variant of the fuel container according to the invention, there is provision for at least one segment to have at least one locking element, preferably in the form of one or more integrally formed-on pins, journals or catch hooks which in the installation position engage in one or more correspondingly formed locking openings of a complementary segment.

The locking element may have play in the locking opening in the longitudinal direction of the support element so that a relative longitudinal movement of the support elements with respect to each other is ensured in the installation position.

If two segments of a support element clamp a baffle plate between them, it may be advantageous for the locking element to engage through at least one aperture of a baffle plate which is arranged between two segments.

Alternatively, there may be provision for at least one segment to have at least one groove profile for receiving a baffle plate element. A corresponding counter-profile of a baffle plate element may, for example, engage behind a groove profile which extends in the longitudinal direction of the relevant segment. The baffle plate element may be engaged in the groove profile. Alternatively, a counter-profile may have been inserted into a groove profile of a segment, which groove profile is open at the end face, wherein the groove profile and the counter-profile form a slotted guiding member.

As already mentioned above, it is advantageous for the segments each to be constructed as a solid profile having a rib structure.

Preferably, the segments are each welded at the end side to the upper base and the lower base of the fuel container. To this end, a welding face may be provided at the end side on each segment, wherein the welding face of the support element which is composed of the segments may be profiled in such a manner that the welding face is smaller than the cross-section through the envelope of the segment or the support element. It is thereby also ensured that the shearing resistance of the fuel container is not too high. The shearing forces introduced into the fuel container in the event of deformation owing to impacts are generally discharged via the welding faces into the upper base or lower base of the fuel container so that it is advantageous for the support element or the individual segments not to be welded to the upper base or the lower base of the fuel container over the entire surface.

In another advantageous variant of the fuel container according to the invention, there is provision for the segments to extend between opposing dome-like indentations of the upper base and the lower base. In this manner, there is produced in each case in the upper base and/or in the lower base of the fuel container an arched profile which enables a more favorable force path in the event of tensile loading, pressure loading and shearing loading.

It is particularly advantageous for the wall of the upper base and/or the lower base to be curved in the region of the indentation with a radius which substantially corresponds to the depth of the indentation. Such a topography of the upper base or the lower base has been found to be particularly advantageous with respect to a favorable force path.

According to another aspect of the invention, there is provided a fuel container of thermoplastic plastics material having an upper base and a lower base which are supported against each other by means of at least one column-like support element, preferably by means of a plurality of column-like support elements, wherein the support element is in each case welded at the end side to a wall of the upper base and a wall of the lower base, wherein the support element extends between at least one dome-like indentation of the wall of the upper base and the lower base or the wall of the lower base and the upper base or between dome-like indentations of the wall of the upper base and the wall of the lower base. Preferably, the wall of the upper base and/or the lower base is/are curved in the region of the indentation with a radius which substantially corresponds to the depth of the indentation.

Figure 6:
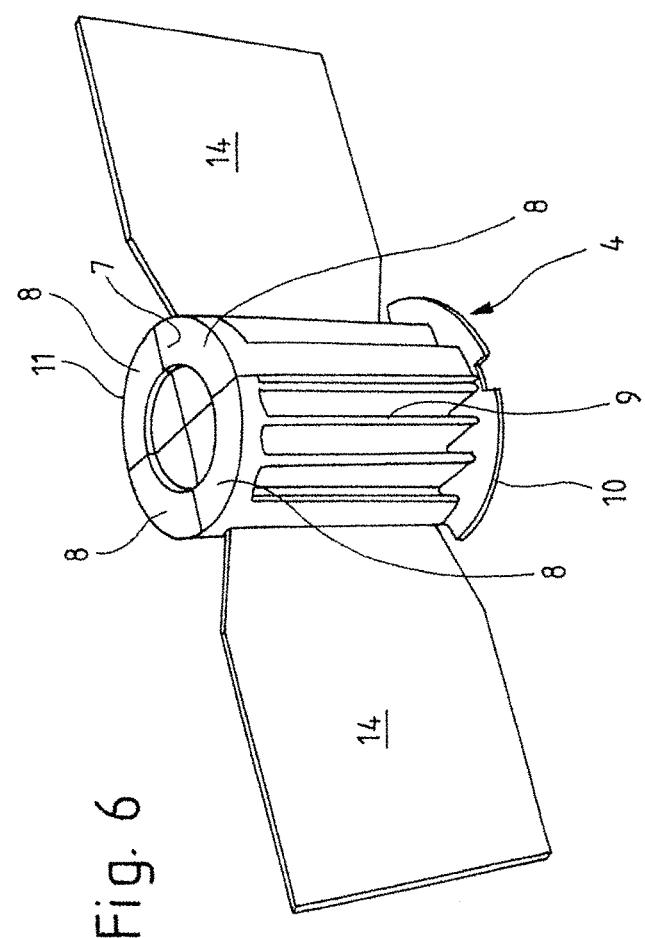

The invention is explained below with reference to an embodiment illustrated in the drawings, in which:

FIG. 1: is a part-section through a fuel container according to the invention, FIG. 2: is a perspective view of a segment of the support element according to the invention, FIG. 3: is another perspective view of a segment of the support element according to the invention, taken in cross-section, FIG. 4: is an exploded view of a support element according to the invention, FIG. 5: shows the assembled support element, and FIG. 6: shows the support element according to the invention with two baffle plate elements secured thereto.

FIG. 1 is a part-section of only a portion of a fuel container 1 constructed from thermoplastic plastics material having a support element 4 which is arranged between an upper base 2 and a lower base 3 of the fuel container 1. The support element 4 is constructed substantially in a column-like manner and extends between an inner wall 6 of the lower base 3 and an inner wall 6 of the upper base 2.

As will further be described below, the support element 4 is welded in each case at the end side to the relevant wall 6 of the upper base 2 and the lower base 3, wherein the upper base 2 is provided with a dome-like indentation 5 in the embodiment illustrated in FIG. 1.

The wall 6 of the fuel container 1 is, for example, constructed from a multi-layer coextrudate of thermoplastic plastics material based on HDPE and may, for example, also comprise barrier layers for hydrocarbons.

The support element 4 is constructed at least in the region of end-side welding faces 7 from a plastics material which is compatible in the context of weldability to the wall 6 of the fuel container 1.

As can be seen in particular from FIGS. 2 to 4, the support element 4 comprises a total of four segments 8. Each of the segments 8 is constructed substantially as a solid plastics profile and substantially forms a quarter-circle segment in cross-section.

Each of the segments comprises an arrangement of ribs 9 which extend in a longitudinal direction so that the covering face of the assembled, substantially cylindrical support element 4 is fissured, as can be seen in the Figures.

The segments 8 each comprise a welding base 10 at the side facing the lower base 3 of the fuel container 1 and a welding ring 11 at the side facing the upper base 2 of the fuel container 1. The welding ring 11 is formed by ring segments of the individual segments 8. In place of a welding ring 11, there may be provided a topography of the relevant end side of the segments 8, which topography is geometrically different therefrom. This topography serves to reduce the welding faces with the relevant wall 6 of the fuel container.

Although in the embodiment illustrated a welding base is provided at the side of the support element 4 facing the lower base 3 and a welding ring 11 is provided at the opposing side, the invention is intended to be understood in such a manner that, for example, welding bases may be provided at both sides or welding rings or similar contours may be provided at both sides.

The segments 8 may be constructed as so-called two-component construction elements having a brittle-rigid base material and a formed-on thermoplastic plastics material which can be welded to the wall 6 of the fuel container 1.

Base materials which can be used for the segments 8 include, for example, polyamide, ABS, POM or the like. Weldable thermoplastic plastics materials which may be considered include, for example, an HDPE.

As can be seen in particular in FIG. 3, each of the segments 8 is provided with two catch hook arrangements 12 and correspondingly constructed catch openings 13. The catch openings 13 are constructed in such a manner that catch projections of the catch hook arrangement can engage behind them. Furthermore, the catch openings 13 are constructed as elongate holes which receive the catch hook arrangement 12 in each case with longitudinal play so that the segments 8 which are joined together to form an assembled support element 4, as illustrated in FIG. 5, are arranged so as to be able to be moved relative to each other in a longitudinal direction.

As an alternative to engaging the segments 8, they may, for example, also be held together by means of a resilient binding. The engagement of the segments 8 acts only as an auxiliary assembly means and is constructed in such a manner that, in the installed position of the support element 4, it does not necessarily have a function.

Reference is now made to FIG. 6, which shows a support element 4 having two baffle plate elements 14. The baffle plate elements 14 are each clamped between two segments 8, wherein the catch hook arrangements 12 of the segments 8 engage through apertures (not illustrated) in the baffle plate elements 14. In this instance, the catch hook arrangements 12 serve to fix the baffle plate elements 11 and ensure that the segments 8 are retained against each other with a degree of pretensioning.

In the embodiment illustrated in FIG. 6, there are provided a total of two baffle plate elements 14, which each extend in a partition plane between two segments 8; however, the invention is intended to be understood in such a manner that the number of baffle plate elements 14 is not critical. For example, baffle plate elements 14 may extend between all the partition planes of the four segments 8 so that on the whole a cross-like arrangement of four baffle plate elements 14 is produced.

Alternatively, the baffle plate elements 14 may be formed integrally or may have been introduced into corresponding longitudinal grooves of the segments 8 or clip-fitted.

Of course, the number of baffle plate elements 14 is then not dependent on the number of segments 8.

The baffle plate elements 14 may have conduits and/or securing means for lines, built-in components or the like. In place of or in addition to baffle plate elements, retention elements or securing means for built-in components of the fuel container 1 may also be provided on the support element 4. Pumps, sensors, valves, lines and the like may be considered, for example, as built-in components.

Of course, the number of segments 8 for forming a support element 4 is also not critical for the invention.

LIST OF REFERENCE NUMERALS

1 Fuel container
2 Upper base
3 Lower base
7 Support element
5 Indentation
6 Wall
7 Welding faces
8 Segments
9 Ribs
10 Welding base
11 Welding ring
12 Catch hook arrangement
13 Catch openings
14 Baffle plate elements

What is claimed is:

1. A thermoplastic fuel container comprising:
   an upper base and a lower base,
   at least one column support element,
   wherein the upper base and the lower base are supported between each other by the at least one column support element,
   wherein the at least one column support element is connected in a positive-locking manner and/or materially engaging manner to a wall of the upper base and to a wall of the lower base, and configured to absorb tensile forces from pressure inside the container,
   wherein the at least one column support element is constructed in several pieces,
   wherein the several pieces of the at least one column support element comprise at least two segments which divide the at least one column support element longitudinally and form a common support face at an end side,
   wherein the at least two segments are movable relative to each other at least in a longitudinal direction, and
   wherein a first segment of the at least two segments has at least one locking element, in a form of an integrally formed-on pin, a journal or a catch hook, which engages in an installation position of a correspondingly formed locking opening of a complementary segment of the at least two segments.

2. The fuel container as claimed in claim 1, wherein the at least two segments complement each other in cross-section.

3. The fuel container as claimed in claim 1, wherein the at least two segments are each constructed integrally.

4. The fuel container as claimed in claim 1, wherein the at least two segments each have a rib profile in cross-section.

5. The fuel container as claimed in claim 1, wherein at least one segment of the at least two segments includes at least one baffle plate element.

6. The fuel container as claimed in claim 5, wherein the at least one baffle plate element is formed integrally with the at least one segment.

7. The fuel container as claimed in claim 1, wherein the at least two segments each include at least one baffle plate element.

8. The fuel container as claimed in claim 1, wherein the at least one column support element includes at least two baffle plate elements.

9. The fuel container as claimed in claim 1, wherein the locking element has play in the locking opening in the longitudinal direction of the at least one column support element.

10. The fuel container as claimed in claim 9, wherein the locking element engages through at least one aperture of a baffle plate element which is arranged between the at least two segments.

11. The fuel container as claimed in claim 1, wherein the at least two segments are each constructed as a solid profile having a rib structure.

12. The fuel container as claimed in claim 1, wherein the at least two segments are each welded at the end side to the upper base or the lower base.

13. The fuel container as claimed in claim 1, wherein the at least two segments extend between at least one inward indentation of the upper base and the lower base and/or the lower base and the upper base or between two opposing inward indentations of the upper base and the lower base.

14. The fuel container as claimed in claim 13, wherein the wall of the upper base and/or the lower base is curved in a region of the inward indentation with a radius.

\* \* \* \* \*